(12) United States Patent
Richens

(10) Patent No.: US 9,758,404 B2
(45) Date of Patent: Sep. 12, 2017

(54) METHODS AND APPARATUSES FOR ADJUSTABLE AIR CAPTURE AND RELEASE

(71) Applicant: WesTech Engineering, Inc., Salt Lake City, UT (US)

(72) Inventor: Jonathan T. Richens, Price, UT (US)

(73) Assignee: WesTech Engineering, Inc., Salt Lake City, UT (US)

( * ) Notice: Subject to any disclaimer, the term of this patent is extended or adjusted under 35 U.S.C. 154(b) by 197 days.

(21) Appl. No.: 14/499,065

(22) Filed: Sep. 26, 2014

(65) Prior Publication Data

US 2016/0090316 A1    Mar. 31, 2016

(51) Int. Cl.
    *C02F 3/08*    (2006.01)
    *B01F 3/04*    (2006.01)
    *C02F 3/00*    (2006.01)

(52) U.S. Cl.
    CPC .............. *C02F 3/082* (2013.01); *C02F 3/006* (2013.01); *C02F 2203/006* (2013.01); *C02F 2209/001* (2013.01); *C02F 2209/22* (2013.01); *Y02W 10/15* (2015.05)

(58) Field of Classification Search
    CPC .... C02F 3/082; C02F 3/08; B01F 7/02; B01F 3/04588; B01F 7/028
    USPC .................................. 210/150, 619; 261/92
    See application file for complete search history.

(56) References Cited

U.S. PATENT DOCUMENTS

| | | | |
|---|---|---|---|
| 4,028,245 A | 6/1977 | Stähler | |
| 4,157,303 A * | 6/1979 | Yoshikawa | C02F 3/082 210/150 |
| 4,318,810 A | 3/1982 | Stähler | |
| 4,623,492 A * | 11/1986 | Pastorek | C02F 3/082 210/150 |
| 4,668,387 A | 5/1987 | Davie et al. | |
| 4,810,377 A * | 3/1989 | Kato | C02F 1/006 210/150 |
| 6,039,873 A | 3/2000 | Stähler | |
| 6,572,774 B2 | 6/2003 | Ricketts | |
| 6,613,229 B2 | 9/2003 | Ricketts | |
| 7,172,690 B2 | 2/2007 | Stähler | |
| 7,276,155 B1 | 10/2007 | Ricketts | |
| 7,897,041 B2 | 3/2011 | Stähler et al. | |
| 2006/0261501 A1 | 11/2006 | Galleta | |
| 2012/0152833 A1 * | 6/2012 | Baxi | C02F 3/082 210/619 |
| 2014/0151306 A1 | 6/2014 | Downey et al. | |

OTHER PUBLICATIONS

PCT/US15/052501, Notification of Transmittal of the International Search Report and the Written Opinion of the International Searching Authority, or the Declaration, mailed on Dec. 15, 2015.
PCT/US15/052501, International Search Report, mailed on Dec. 15, 2015.
PCT/US15/052501, Search History, mailed on Dec. 15, 2015.
PCT/US15/052501, Written Opinion of the International Searching Authority, mailed on Dec. 15, 2015.

* cited by examiner

*Primary Examiner* — Claire Norris
(74) *Attorney, Agent, or Firm* — Austin Rapp & Hardman

(57) ABSTRACT

Methods and apparatuses for adjusting an angular orientation of a media unit having an opening are disclosed. The media unit may be secured to a rotating frame. In addition, a rotating frame including multiple media units at different angular orientations is disclosed.

21 Claims, 6 Drawing Sheets

METHODS AND APPARATUSES FOR ADJUSTABLE AIR CAPTURE AND RELEASE

TECHNICAL FIELD

The present invention relates generally to the treatment of water and wastewater. More specifically, the present invention relates to optimizing the operation of rotating treatment units.

BACKGROUND

Rotatable treatment units may be used in water treatment systems. Rotatable treatment units may be employed, for example, to cause oxygen to dissolve in a particular liquid containing contaminants and to enable alternating respiration and submersion of microorganisms, which attach to portions of the rotatable treatment units. Unfortunately, conventional rotatable treatment units are not adjustable or customizable after installation and thus cannot be easily adapted to changing circumstances within the water treatment system. Accordingly, an improved aeration system is desirable.

SUMMARY

Embodiments of the disclosed subject matter are provided below for illustrative purposes and are in no way limiting of the claimed subject matter.

A rotating treatment unit is disclosed. A frame of the rotating treatment unit may comprise a rotation mechanism such that the frame is rotatable about an axis of rotation. One or more media units may be secured to said frame.

Each media unit may have a perimeter defining an interior region and at least one opening in the perimeter. The at least one opening may allow air and liquid to enter and exit the interior region as the frame rotates about the axis of rotation when the rotating treatment unit is partially disposed in both the air and the liquid. At least one of the media units may comprise an adjustable media unit.

The rotating treatment unit may further comprise an adjustment mechanism secured to the adjustable media unit. The adjustment mechanism may have a locked and an unlocked state. In an unlocked state, the adjustable media unit may be rotated relative to the frame to adjust an angular orientation of the adjustable media unit relative to the frame without modification of the physical structure of the adjustable media unit or the frame. In the locked state, the angular orientation of the adjustable media unit is fixed with respect to the frame at one of two or more angular orientations.

The adjustable media unit may comprise a shaft with opposing first and second ends. At least one of the first and second ends may be positioned within an opening in the frame such that the adjustable media unit may rotate about the shaft to alter the angular orientation of the adjustable media unit relative to the frame when the adjustment mechanism is in an unlocked state.

In one embodiment, the adjustment mechanism comprises a lever arm and a pin. The lever arm may be secured to the adjustable media unit at a fixed angular orientation relative to the adjustable media unit. The pin may be disposed on the lever arm and may be offset from a point on the lever arm where the adjustable media unit attaches to the lever arm. The pin may be positionable in one of a plurality of pin openings in the frame to lock the orientation of the adjustable media unit relative to the frame when the adjustment mechanism is in one of the two or more angular orientations in the locked state.

In another embodiment, the adjustment mechanism may comprise a second shaft secured to the adjustable media unit. A longitudinal axis of the shaft of the adjustable media unit may be offset from a longitudinal axis of the second shaft on the adjustable media unit. The second shaft may be positioned within an arcuate slot in the frame at one of a plurality of different locations to adjust the angular orientation of the adjustable media unit relative to the frame.

The axis of rotation may be oriented in a substantially horizontal orientation when the rotating treatment unit is in an assembled and installed state. A longitudinal axis of the shaft of the adjustable media unit may be offset from the axis of rotation of the frame. Also, the adjustable media unit may comprise multiple disks nested together.

In one embodiment, at least three media units are oriented at different angular orientations relative to the frame. The angular orientation of each media unit relative to the frame may be defined by an angle between a radial line extending from the center of the media unit through the axis of rotation of the frame and another line extending from the center of the media unit through the center of the at least one opening in the media unit.

In one configuration, at least one opening of the adjustable media unit is oriented relative to the frame such that, during rotation of the frame about the axis of rotation when the rotating treatment unit is partially disposed both in the air and the liquid, the adjustable media unit begins to release air captured within the interior region of the adjustable media unit through the at least one opening of the adjustable media unit into the liquid at a longer or shorter distance from a point of entry into the liquid than other media units.

At least one opening of the adjustable media unit may be oriented relative to the frame such that the adjustable media unit will capture more or less air than other media units or essentially no air during rotation of the frame about the axis of rotation when the rotating treatment unit is partially disposed both in the air and the liquid.

Another embodiment of a rotating treatment unit may comprise a frame including a rotation mechanism such that the frame is rotatable about an axis of rotation. One or more media units may be attached to the frame.

Once again, each media unit may have a perimeter defining an interior region and at least one opening in the perimeter. The at least one opening allows air and liquid to enter and exit the interior region as the frame rotates about the axis of rotation when the rotating treatment unit is partially disposed in both the air and the liquid. At least one of the one or more media units comprises an adjustable media unit.

Such an embodiment may include an adjustment mechanism configured to enable rotation and fixing of an angular orientation of the adjustable media unit relative to the frame to one of two or more different angular orientations without modification of the physical structure of the adjustable media unit or the frame.

The adjustment mechanism may comprise a lever arm and a pin, the lever arm being secured to the adjustable media unit at a fixed angular orientation relative to the adjustable media unit. The pin may be disposed on the lever arm and may be offset from a point on the lever arm where the adjustable media unit attaches to the lever arm. The pin may be positionable in one of a plurality of pin openings in the frame to lock the orientation of the adjustable media unit relative to the frame when the adjustment mechanism is in one of the two or more angular orientations in a locked state.

The adjustable media unit may comprise a shaft having a first and second end. At least one of the first and second ends may rotationally engage the frame when the adjustment mechanism is in an unlocked state. The adjustment mechanism may comprise a second shaft secured to the adjustable media unit. A longitudinal axis of the shaft of the adjustable media unit may be offset from a longitudinal axis of the second shaft. The second shaft may be positioned within an arcuate slot in the frame at one of a plurality of different locations to adjust the angular orientation of the adjustable media unit relative to the frame.

Also, the one or more media units may comprise a second adjustable media unit.

In one embodiment, a rotating treatment unit may also comprise a frame including a rotation mechanism such that the frame is rotatable about an axis of rotation. One or more media units are attached to said frame.

Once again, each media unit may have a perimeter defining an interior region and at least one opening in the perimeter. The at least one opening allows air and liquid to enter and exit the interior region as the frame rotates about the axis of rotation when the rotating treatment unit is partially disposed in both the air and the liquid. At least one of the one or more media units may comprise an adjustable media unit.

Such an embodiment may further comprise an adjustment means for rotation and fixing of an angular orientation of the adjustable media unit relative to the frame to one of two or more different angular orientations without modification of the physical structure of the adjustable media unit or the frame.

The adjustment means may comprise a lever arm and a pin with the lever arm being secured to the adjustable media unit at a fixed angular orientation relative to the adjustable media unit. The pin may be disposed on the lever arm and may be offset from a point on the lever arm where the adjustable media unit attaches to the lever arm. The pin may be positionable in one of a plurality of pin openings in the frame to lock the orientation of the adjustable media unit relative to the frame when the adjustment means is in one of the two or more angular orientations in a locked state.

As indicated previously, the adjustable media unit may comprise multiple disks nested together.

In one embodiment, a rotating treatment unit may comprise a frame including a rotation mechanism such that the frame is rotatable about an axis of rotation. A first media unit and a second media unit may be secured to said frame.

Each of the first and second media units may have a perimeter defining an interior region and at least one opening in the perimeter. The at least one opening allows air and liquid to enter and exit the interior region of each media unit as the frame rotates about the axis of rotation when the rotating treatment unit is partially disposed in both the air and the liquid. At least one of the media units may comprise an adjustable media unit.

The first media unit may be at a first angular orientation relative to the frame and the second media unit may be at a second angular orientation relative to the frame. In one embodiment, the first angular orientation is different from the second angular orientation.

A method of optimizing operation of a rotating treatment unit is also disclosed. In such an embodiment, the treatment unit may comprise a frame rotatable about an axis of rotation and an adjustable media unit secured to the frame. The adjustable media unit may have a perimeter defining an interior region and at least one opening in the perimeter. An angular orientation of the adjustable media unit may be adjustable and fixable with respect to the frame at one of two or more different angular orientations.

The frame of the treatment unit may be rotated about the axis of rotation while the rotating treatment unit is partially disposed in both liquid and air such that the liquid and the air may enter and exit the adjustable media unit.

The angular orientation of the adjustable media unit may be adjusted relative to the frame without modification of the physical structure of the adjustable media unit or the frame.

In one embodiment, rotating the frame of the treatment unit about the axis of rotation causes air captured within the adjustable media unit to exit the opening when the adjustable media unit is positioned within the liquid, thereby resulting in oxygen within the air to be dissolved at least partially in the liquid.

The method may further comprise determining a level of oxygen dissolved within the liquid. In addition, in one embodiment, the angular orientation of the adjustable media unit relative to the frame may be adjusted to alter the level of oxygen dissolved within the liquid.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

Figure 1:
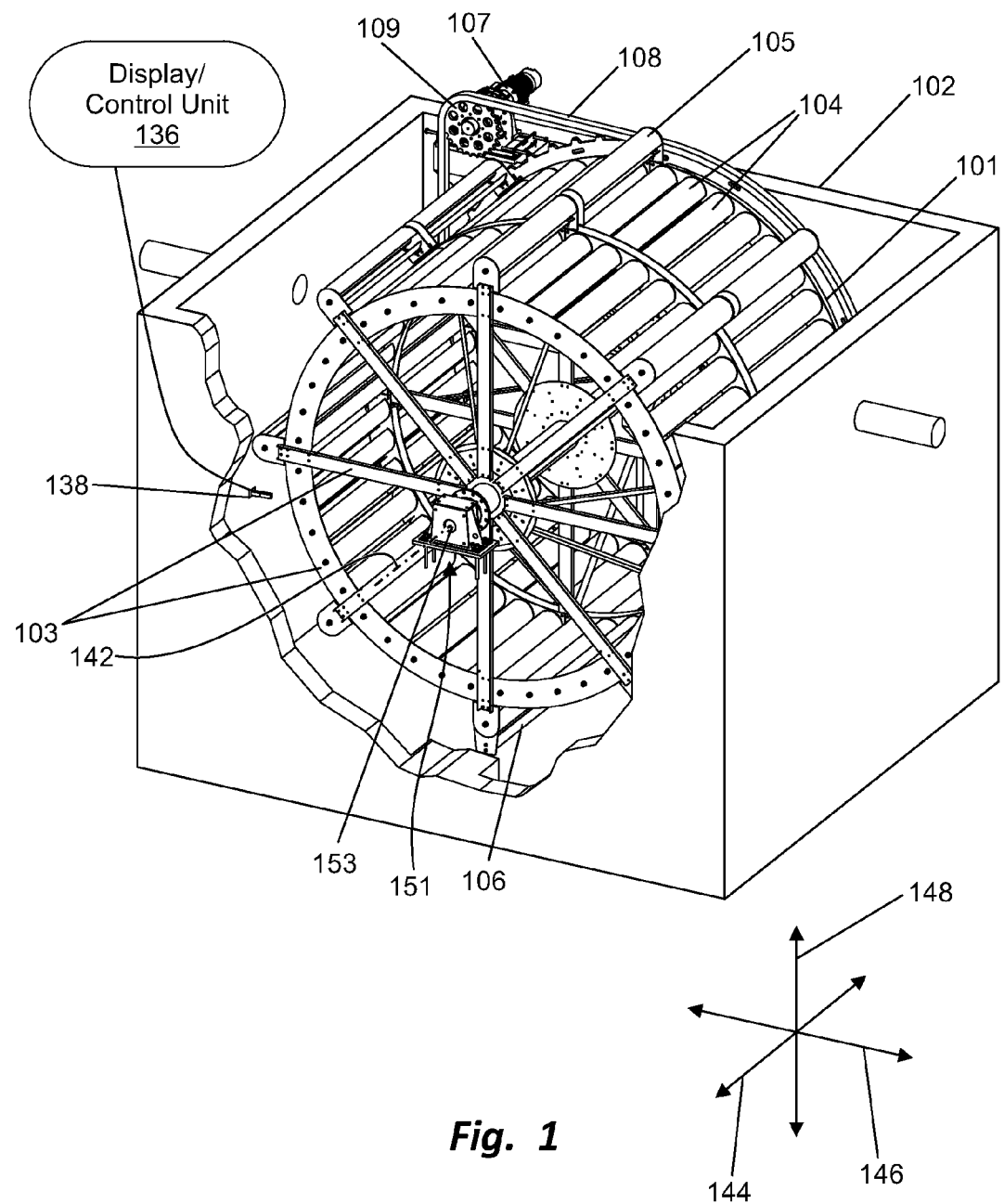
FIG. 1 is a perspective view of one embodiment of a rotating treatment unit installed in a treatment basin shown together with a display/control unit and a sensor.

In accordance with common practice, the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION OF THE DRAWINGS

Various aspects of the disclosure are described below. It should be apparent that the teachings herein may be embodied in a wide variety of forms and that any specific structure, function, or both being disclosed herein is merely representative. Based on the teachings herein, one skilled in the art should appreciate that an aspect disclosed herein may be implemented independently of any other aspects and that two or more of these aspects may be combined in various ways even if not shown or disclosed in the same figure or portion of the disclosure. Further, the disclosed apparatuses and methods may be practiced using structures or functionality in addition to disclosed subject matter based on information known to one of skill in the art.

The word "exemplary" is used exclusively herein to mean "serving as an example, instance, or illustration." Any embodiment described herein as "exemplary" is not necessarily to be construed as preferred or advantageous over other embodiments.

The term "an embodiment," "an alternative embodiment" or "one embodiment" may refer to various configurations or embodiments of the disclosed apparatuses, systems or methods in the singular or plural form, rather than referring to a single, particular embodiment.

In the figures, certain components may appear many times within a particular drawing. However, only certain instances of the component may be identified in the figures to avoid an unnecessary repetition of reference numbers and lead lines. According to the context provided in the description while referring to the figures, reference may be made to a specific one of that particular component or multiple instances, even if the specifically referenced instance or instances of the component are not identified by a reference number and lead line in the figures.

The treatment apparatus and method described herein may be employed, for example, in an integrated fixed-film/activated sludge (IFAS) process. Such a process may comprise a biological wastewater treatment system that normally combines attached growth microorganisms, referred to as fixed-film, with suspended microorganisms, referred to as activated sludge. However, this equipment has also been employed in treatment systems that are considered fixed-film treatment only. Conversely, the disclosed apparatuses and methods have also been employed in treatment systems that are considered activated sludge treatment only. Additionally, these systems and methods may be employed in systems for aeration only, for either further treatment of biology in a biological digester or for air stripping of contaminants. Although disclosed systems and methods can and have been employed in many types of treatment processes, for simplicity, such an apparatus will be referred to as a "rotating treatment unit" within this disclosure. One embodiment of a rotating treatment unit is illustrated, for example, in FIG. 1.

The rotating treatment unit may be installed in a treatment basin or tank and may be partially submerged. The treatment basin may receive a liquid stream with both micro-constituents and macro-constituents that need to be metabolized, oxidized or air stripped. For the purposes of this description, we can refer to the contaminated liquid stream as the contaminated stream, waste stream, waste liquid or wastewater. The liquid in question can be flowing or stagnant.

A rotating treatment unit may comprise a plurality of media units (which may comprise one or more sections or bundles) attached to a frame. The frame may comprise a rotation mechanism such that the frame is rotatable about an axis of rotation. These media units may comprise a series of disks or plates that fit together to form a continuous section, or the units may be a solid continuous section (such as a pipe or other hollow member) packed with some type of media for providing surface area, or simply a solid continuous section that is empty. These media units may be configured in many shapes, ranging from round or pipe-like in cross-section (see, e.g., FIG. 3) to multi-sided or triangular-shaped (see, e.g., FIG. 6.) Each media unit, regardless of shape or specific configuration, comprises a hollow or largely hollow enclosed chamber designed to capture and release air and liquid through one or more openings in the media unit as a frame of the rotating treatment unit rotates. In at least some configurations, at least some of the air is released as bubbles within the liquid. One type of media unit has an opening along the length of the media unit. The opening may be parallel to the axis of the rotating treatment unit.

Such a rotating treatment unit may also act as a carrier or medium to which microorganisms within a fixed-film treatment system attach. Thus, media units may be designed with a high surface area upon which these organisms may grow. As the mechanism rotates about its axis, the attached microorganisms are exposed to repeated cycles of feeding and respiration. During normal operation, the sections of the mechanism that are submerged provide contact time for the attached microorganisms to absorb, adsorb and/or consume the contaminants in the wastewater. During rotation, the microorganisms also experience periods of non-submergence, at which time the organisms can respire in an aerobic environment for improved treatment efficiency.

Figure 2:
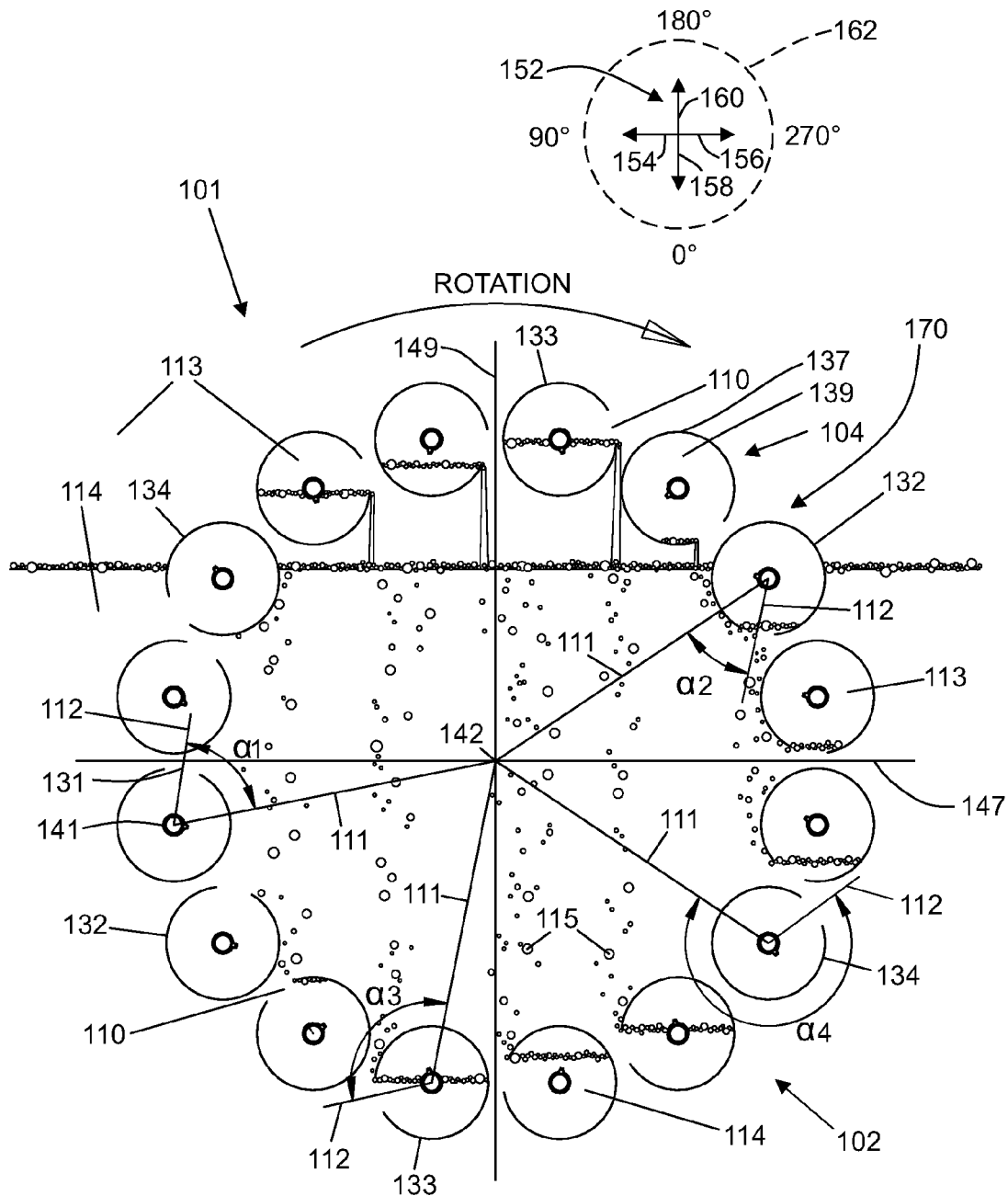
FIG. 2 is an illustrative partial, cross-sectional view of one embodiment of a rotating treatment unit in an installed and operative condition.

As illustrated, for example, in FIG. 2, during operation, as the treatment unit rotates, it captures atmospheric air (including oxygen) and carries it into the wastewater. As the rotation continues, the captured air is released into the liquid in a lower or other portion of the basin, adding dissolved oxygen to the liquid and at the same time providing energy to mix the liquid in the basin. The dissolved oxygen allows for the aerobic respiration of treatment microorganisms suspended in the wastewater when operated as part of an activated sludge or IFAS process.

The orientation of the opening(s) into the interior region of each media unit with respect to the liquid surface affects three variables that determine the effectiveness and efficiency of the treatment process. First, the orientation of the opening(s) determines the total quantity of air captured by each media section as it enters the liquid with each rotation of the mechanism. Second, the orientation of the opening(s) determines the depth at which the captured air will be released within the waste liquid as the mechanism rotates. The deeper the air is released within the liquid, the longer the air has to contact the liquid as it bubbles upward. The longer the air and liquid are in contact, the more oxygen will be dissolved in the liquid, resulting in a higher aeration efficiency. Finally, the orientation of the opening(s) in the media sections determines the location and distribution of the released air bubbles throughout the treatment basin, thus affecting mixing effectiveness and efficiency.

Figure 4:
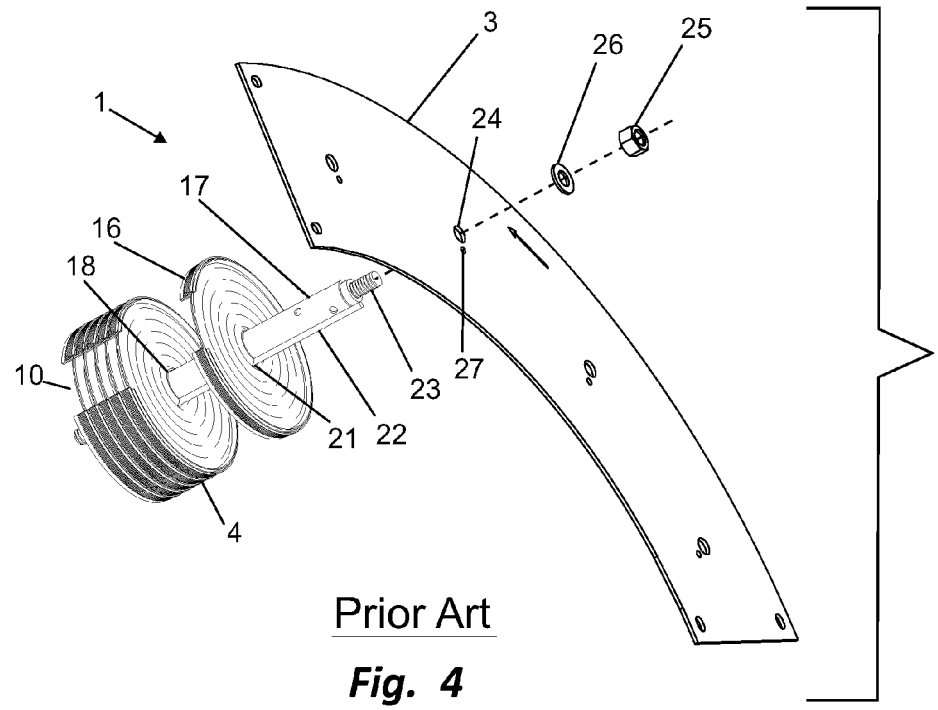
FIG. 4 is an exploded view of one embodiment of a conventional rotating treatment unit, showing the fixed orientation of a media bundle when attached to the frame of a rotating treatment unit.

In previous rotating treatment unit designs, the orientation of the opening(s) in the media sections was identical for all sections. It was set and fixed during assembly (as illustrated in FIG. 4) to accommodate a single liquid level and to provide the optimum amount of aeration and mixing necessary to treat at a specific predetermined design flow and contaminant loading. However, these design parameters are selected based on flows and process loads that may be projected as much as 20 years in the future. Very often, when the treatment unit is initially set into operation, flows and loadings are significantly lower than the flows and loadings identified by the 20-year projections. Thus, the treatment unit may be designed, for example, to supply considerably more oxygen to the process than is actually required for much of its design life. Too much oxygen in a biological treatment system can be detrimental to the effectiveness of the overall process. For example, it can promote the growth of unwanted filamentous bacteria which do not settle readily and are thus not easily removed in subsequent downstream settling basins.

Since the orientation of the opening(s) into the media units cannot be changed or adjusted once the rotating treatment unit is constructed, treatment plant operators have often had to endure less-than-optimal treatment effectiveness and efficiency throughout much of the design life of such units.

As there are at least three process variables tied to the orientation of the opening(s) into the media sections/bundles with respect to the water surface, a method for adjusting the orientation of each media section or set of sections in the mechanism would allow operators to optimally tailor the configuration of a rotating treatment unit to the current treatment needs of their plant. This would result in increased system efficiency, improved treatment performance and savings in energy.

The advancement described herein (see, for example, embodiments in FIGS. 5 and 6) is an apparatus and method which allows adjustment of the orientation of one or more media units after the sections are incorporated into the rotating treatment unit and/or after the unit is installed in a treatment basin. This adjustment in angular orientation allows one or more units of the treatment unit to be oriented to capture maximum air, while one or more others could be positioned for maximum air release depth and/or to promote more uniform mixing of the basin. One or more media units may even be effectively removed from service entirely by orienting their openings such that these media units will capture effectively no air as the unit rotates, thus reducing the amount of oxygen introduced into the liquid by the treatment unit, as well as reducing the amount of energy needed to rotate the unit. The orientation of the media units is flexible enough to allow a system operator to make adjustments to optimize the configuration of the treatment unit based on the actual flows and contaminant loads at the installation rather than being based on future projections.

The range of possible orientations of the media bundles or sections may be specific to the type and configuration of media used. An experienced practitioner in the art will recognize that there are numerous potential mechanical configurations or designs that will allow the orientation of the media units to be adjusted after assembly of the treatment unit. The design selected will be a function of the type and shape of the media, the support and alignment means of the media bundles or sections, and the practicality of the adjustment apparatus. The embodiments shown in the drawings are examples only, and should not be construed to restrict the application of the invention.

Referring to FIG. 1, one embodiment of a rotating treatment unit 101 is shown installed in a treatment basin 102. In addition, FIG. 1 also illustrates a display/control unit 136 coupled to a sensor 138.

As shown in FIG. 1, the rotating treatment unit 101 may comprise a rotating frame 103 and one or more media units 104 mounted to the frame 103. The media units 104 in the embodiment shown in FIG. 1 are cylindrical in shape, although the media units 104 may have other shapes as well, as illustrated, for example, in FIG. 6. Media units 104 may be mounted to the frame 103 in various configurations. In FIG. 1, most of the media units 104 are mounted at a constant radius from the axis of rotation 142 of the rotating frame 103, with several auxiliary media units 105 mounted radially outside the other, more centrally located media units 104. The auxiliary media units 105 provide both additional aeration capacity for a treatment process and also provide additional surface area upon which fixed-film microorganisms may grow. The example shown in FIG. 1 also includes an optional mixing paddle 106, which may be added to assist in mixing the liquid in the lower portion of the treatment basin 102.

The rotating frame 103 may comprise a rotation mechanism 151 such that the frame 103 may rotate with respect to an axis of rotation 142. The rotation mechanism 151 may comprise, for example, an axle 153 together with greased bearings or other low friction mechanism.

In this embodiment, the rotation mechanism 151 may further comprise a motor drive assembly 107 mounted to the wall of the basin 102 in conjunction with a drive chain 108 and sprocket assembly 109. The rotation mechanism 151 may cause the frame 103 to rotate about the axis of rotation 142 when the treatment unit 101 is in an assembled and operative condition. Other mechanisms and methods for causing the rotating frame 103 to rotate about the axis of rotation 142 come within the scope of the disclosed rotation mechanism 151.

As illustrated in FIG. 1, the rotating treatment unit 101 may have multiple dimensions, including a longitudinal dimension 144 (which is generally parallel to the axis of rotation 142 of the rotating frame 103), a depth dimension 146 and a height dimension 148. Each of these dimensions 144, 146, 148 is perpendicular to the other two dimensions 144, 146, 148. The height dimension 148, when the unit 101 is in an assembled and installed configuration, is parallel with a vector representing the downward pull of gravity, while both the longitudinal dimension 144 and the depth dimension 146 are perpendicular to the height dimension 148. The dimensions 144, 146, 148 correspond to the structure of the rotating treatment unit 101 irrespective of the actual orientation of the rotating treatment unit 101 with respect to the pull of gravity.

As indicated above, FIG. 1 also illustrates a display/control unit 136 coupled to a sensor 138. The display/control unit 136 may receive signals from a sensor 138 and display received and processed information and/or control aspects of the treatment unit 101 using the received information. The sensor 138, in one embodiment, may comprise a dissolved oxygen sensor 138. Based on the information received from the dissolved oxygen sensor 138, the angular orientation of the media units 104 may be altered either manually or in an automated fashion to alter the amount of dissolved oxygen present in the liquid.

FIG. 2 comprises a simplified, partial, cross-section view of one embodiment of a rotating treatment unit 101 in an assembled and operative condition. For clarity, the rotating frame 103 is not shown in FIG. 2. In this example, the media units 104 are circular in cross-sectional shape, and are all mounted at the same radial distance from the center or axis of rotation 142 of the frame 103 of the treatment unit 101. Each media unit 104 comprises an interior region 139 with an essentially airtight perimeter 137 and an opening 110 in the perimeter 137 of the media unit 104. The opening 110 allows liquid 114 to enter and leave the interior region 139 of the media unit 104, while at the same time capturing atmospheric air 113 and carrying it into the liquid 114 as the frame 103 (shown in FIG. 1) rotates. As the frame 103 rotates, air 113 escapes from the openings 110 as bubbles 115 in the liquid 114. These bubbles 115 rise through the liquid 114, acting both to mix the liquid 114 in the basin 102 and to dissolve oxygen, within the air 113 into the liquid 114. The angular orientation of the opening 110 into the interior region 139 of the media units 104 is shown as an angular dimension a between a radial line 111 extending from the center 141 of the media unit 104 through the axis of rotation 142 of the frame 103 (shown in FIG. 1) of the rotating treatment unit 101 and another line 112 extending from the center 141 of the media unit 104 through the center 131 of the opening 110 into said media unit 104. FIG. 2 further serves to illustrate how changing the angular orientation of the openings 110 into the media units 104 affects the amount of air 113 captured as each media unit 104 enters the liquid 114 and how far around the circumference of the rotating frame 103 the captured air 113 is carried before it is released into the liquid 114. Most of the media units 104 in FIG. 2 are oriented at angle α1. In certain embodiments, the angle α1 is a standard angular orientation which balances air capture and distribution throughout the basin 102. However, as illustrated in FIG. 2, two media units 132 are oriented at angle α2, which is somewhat smaller than angle α1, such that these media units 132 will capture the maximum amount of air 113 possible as the media units 132 enter the liquid 114. The angle α2 represents an angular orientation at which the opening 110 of a media unit 104 most directly and fully contacts the liquid 114 at the point of entry 170 into the liquid 114. Of course, the point of entry 170 into the liquid 114 is a factor of the positioning and size of the rotating frame 103 relative to the level of the liquid 114.

Two other media units 133 are oriented at angle α3, which is somewhat larger than angle α1, such that these media units 133 will carry air 113 farther around the circumference of the rotating treatment unit 101 to provide more mixing energy in that portion of the basin 102. Finally, two other media units 134 are shown oriented at angle α4, which is approximately 180 degrees from angle α2, such that these media units 134 will capture essentially no air 113 as these media units 134 enter the liquid 114. In various embodiments, essentially no air 113 means that less than 2%, 3% or 5%, by volume, of the interior region 139 of a media unit 104 is occupied by air 113 upon immersion of the media unit 104 into the liquid 114. The angle α4 represents an angular orientation at which the opening 110 of a media unit 104 is directly opposite the liquid 114 at the point of entry 170. Angular orientations of the opening 110 capture an increasingly smaller amount of air 113 as the angular orientation is moved toward angle α4 in either direction from angle α2.

FIG. 2 also includes both a directional guide 152 and an angular position guide 162. Both the directional guide 152 and the angular position guide 162 are oriented in FIG. 2 with respect to the pull of gravity. The directional guide 152 includes a direct upward direction 160 (directly opposite the gravitational pull), a direct downward direction 158 (aligned with the gravitational pull), a direct leftward direction 154 and a direct rightward direction 156. In contrast, the angular position guide 162 includes a 360° range of the angular positions with, for example, a 0° position referring to a direct downward position, a 90° position referring to a direct leftward position, a 180° position referring to a direct upward position, and a 270° position referring to a direct rightward position. For example, a media unit 104 having an opening 110 with a center 131 at the angle α2 would have a direct downward position (a 0° position) at the point of entry 170 of the media unit 104 into the liquid 114. Of course, the angular position of such an opening 110 would move or change through 360° of angular positions as the pertinent media unit 104 rotated about the axis of rotation 142.

Because the air 113 is buoyant within the liquid 114, any air 113 within a media unit 104 will move in a direct upward direction 160 and accumulate within an upper portion (the portion within the media unit 104 opposite the gravitational pull) of the media unit 104. Accordingly, air 113 within the media unit 104 will begin to escape from the media unit 104 (because of the buoyant force of the air 113 in a direct upward direction 160) when a portion of the air 113 within the media unit 104 reaches the opening 110 of the media unit 104 as the media unit 104 rotates with respect to the axis of rotation 142 (which, as indicated above, causes the opening 110 to move through the 360° of angular positions for each revolution of the media unit 104 about the axis of rotation 142). When a portion of air 113 in the media unit 104 has an unimpeded course in a direct upward direction 160 because of the rotation of the opening 110 relative to the direct upward direction 160, that portion of the air 113 captured in the media unit 104 will be released into the liquid 114 allowing at least a portion of the oxygen within the air 113 to dissolve into the liquid 114.

As indicated previously, depending on the angular orientation (such as α1, α2, α3 and α4) of the opening 110 around the perimeter 137 of the media unit 104, the air 113 will be released at different regions along the horizontal axis 147 and at different depths within the liquid 114 along a vertical axis 149. Having openings 110 at different angular orientations with respect to the frame 103 enables custom tailoring of dissemination of air 113 (both with respect to the positioning of the release of air 113 along a horizontal axis 147 and the depth at which the air 113 is released along a vertical axis 149) and thus the dissolving of oxygen within the liquid 114 and the mixing of the liquid 114. The embodiment shown in FIG. 2 illustrates a treatment unit 101 in which the openings 110 on one or more of the media units 104, 132, 133, 134 are disposed at different angular orientations.

As illustrated in FIG. 2, the frame 103 rotates in a clockwise direction. Accordingly, the angular position of the openings 110 on each media unit 104 will move in a clockwise direction with respect to the buoyant pocket of air 113 positioned at the top of each media unit 104 (and with respect to the direct upward direction 160) during clockwise rotation of the frame 103. Thus, for example, during rotation of the frame 103 about the axis of rotation 142, when the rotating treatment unit 101 is partially disposed both in the air 113 and the liquid 114, media units 132 disposed at angular orientation $\alpha_1$ begin to release air 113 captured within the interior region 107 of the media units 132 through the opening 110 of the media units 132 into the liquid 114 at a shorter distance (in this case, a shorter circumferential difference) from a point of entry 170 into the liquid 114 than the media units 104 disposed at the angular orientation α3. In operation, conversely, media units 133 disposed at angular orientation α3 begin to release air 113 captured within the interior region 139 of the media units 133 through the opening 110 of the media units 133 into the liquid 114 at a longer distance from a point of entry 170 into the liquid 114 than the media units 132 disposed at the angular orientation $\alpha_1$. The position along the horizontal axis 147 at which a media unit 104 having an opening 110 of a particular angular orientation will begin to release air 113 into the liquid 114 is a consequence, at least in part, of the angular orientation of the opening 110 and the amount of air 113 captured within the media unit 104. The amount of air 113 captured within the media unit 104 will thus also vary based on the level of the liquid 114 relative to the treatment unit 101. In an alternative embodiment, the frame 103 may rotate in a counterclockwise direction, resulting in a corresponding set of factors controlling the establishment of the angular orientation of each of the openings 110 on media units 104, 132, 133, 134 on the rotating unit 101 to alter or effectuate the oxygen distribution within the liquid 114.

Further, in certain embodiments, one or more of the media units 104, 132, 133, 134 may be adjustable media units 104, 132, 133, 134. In an unlocked state, the angular orientation of an adjustable media unit 104, 132, 133, 134 may be altered without disassembly of the media units 104, 132, 133, 134 from the rotating frame 103 or without modification of the physical structure of the media units 104, 132, 133, 134 or frame 103. In a locked state, the angular orientation of the adjustable media units 104, 132, 133, 134 remains fixed.

Figure 3:
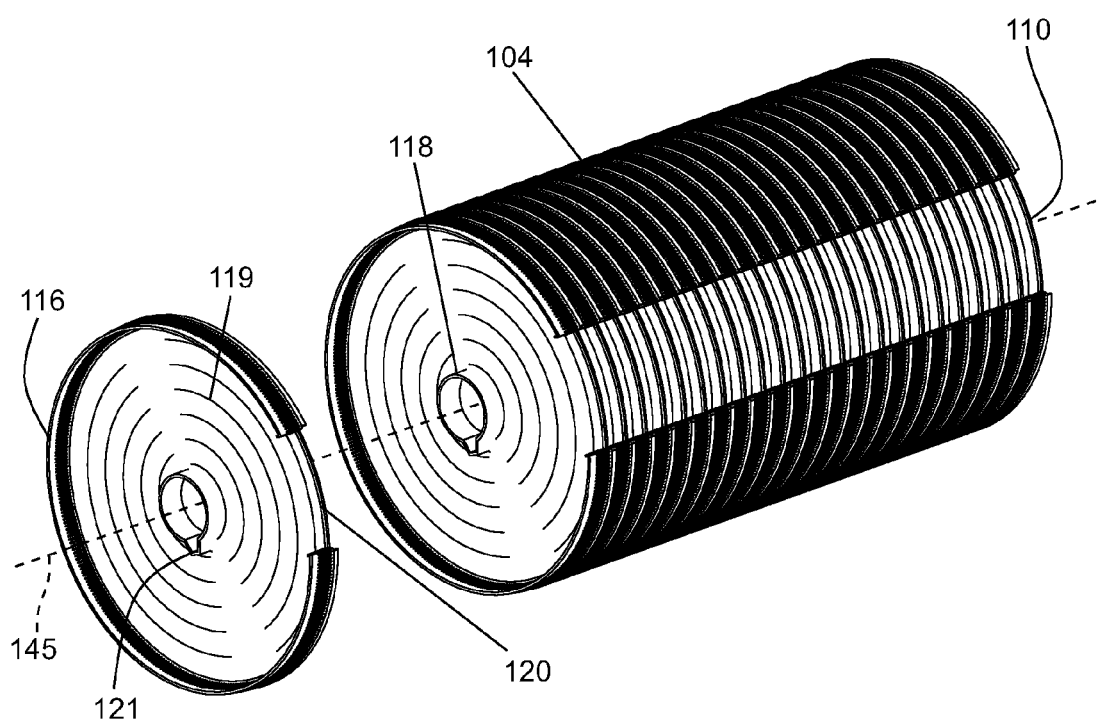
FIG. 3 is a perspective, partial view of one embodiment of a media unit that may be used in a rotating treatment unit, with this view specifically showing the opening in which a shaft may be positioned.

Referring to FIG. 3, one embodiment of a media unit 104 may be created by nesting together circular media disks 116 to create a cylindrical media unit 104 that is airtight or essentially airtight except for a longitudinal opening 110 parallel to the longitudinal axis 145 of the media unit 104. The disks 116 may be mounted on a shaft 117 (shown in FIG. 5) through a hole 118 at the center or other position within each disk 116. The disks 116 may include corrugations 119 to increase the surface area upon which fixed-film microorganisms can grow. The disks 116 may be oriented such that their individual openings 120 align to form a combined common opening 110 into the hollow interior of the assembled media unit 104, although the openings of each disk 116 may be offset from an adjacent disk 116 or another disk 116 within the media unit 104. This common alignment may be maintained during and after assembly of the media unit 104 by use of a keyway 121 in the hole 118 in the disks 116. Other methods or mechanisms may also be used to keep such nested media disks 116 in a set alignment with each other and with the rotating frame 103.

FIG. 4 shows an exploded view of one example of a conventional mechanism for assembly and attachment of a media unit 4 to the frame 3 of a rotating treatment unit 1. Media disks 16 are assembled on a shaft 17 through the hole 18 in their center to form a media unit 4. A common alignment of all disks 16 in the unit 4 is assured using a key rod 22 which is attached to and fixed along the length of the shaft 17. A keyway 21 formed as part of the hole 18 at the center of each disk 16 fits snugly over the key rod 22 and acts to fix the alignment and orientation of each of the disks 16, thus producing a common longitudinal opening 10 along the assembled media unit 4. When assembled, the threaded end 23 of the shaft 17 extends through a hole 24 in the rotating frame 3, and is securely fastened to the frame 3 by means of a nut 25 and washer 26. At the same time, the end of the key rod 22 extends through a smaller hole 27 in the frame 3, which fixes its orientation and prevents the shaft 17 and attached media unit 4 from rotating with respect to the frame 3. The angular orientation of the media unit 4 cannot be changed once the media unit is assembled to the frame 3 and no adjustability is contemplated by the design.

Figure 5:
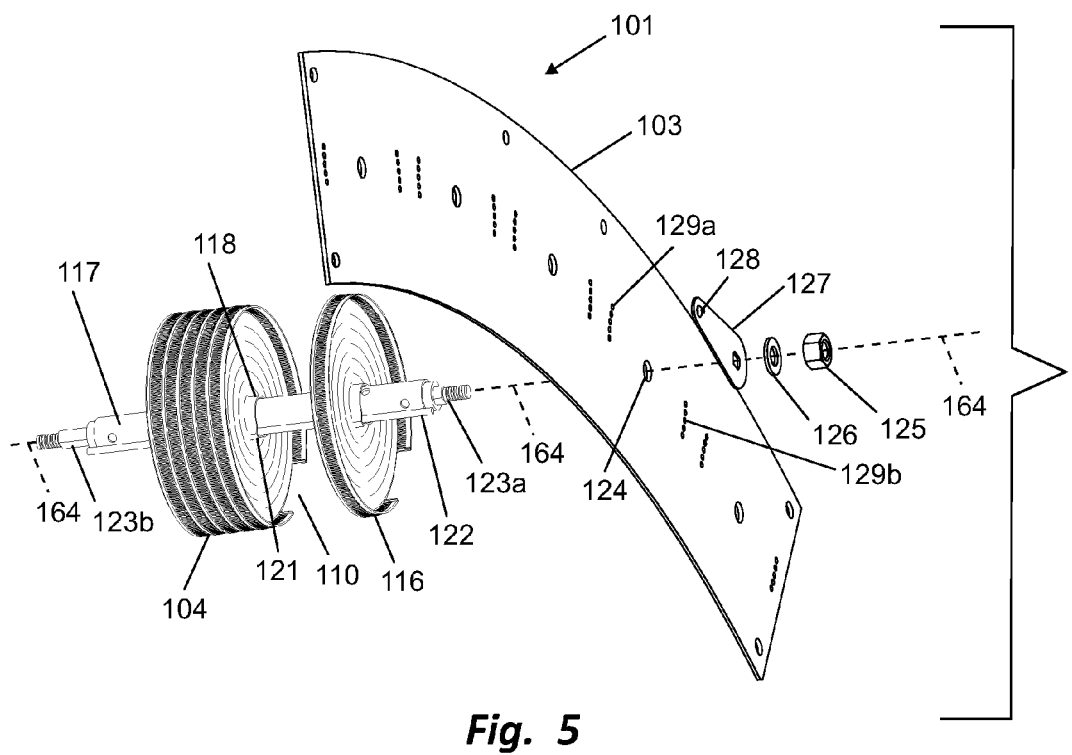
FIG. 5 is an exploded, partial view of one embodiment of the invention, showing an embodiment of an apparatus and means for adjusting the angular orientation of a media unit relative to the frame.

FIG. 5 shows one embodiment of the present invention, in which the orientation of the opening(s) 110 into each media unit 104 may be easily adjusted without disassembling and/or without making modifications to the physical structure of the rotating unit 101. Media disks 116 are assembled on a shaft 117 through a hole 118 at their center to form an adjustable media unit 104. Common alignment of the disks 116 may be ensured using a key rod 122 fixed along the length of the shaft 117. A keyway 121 formed as part of the hole 118 at the center of each disk 116 may fit snugly over the key rod 122 to fix the alignment of each disk 116 along the shaft 117, producing a common longitudinal opening 110 along the length of the assembled media unit 104. In alternative embodiments, the media unit 104 comprises a unitary member or alternative methods or mechanisms are used to secure each disk 116 to an adjacent disk 116. However, unlike prior art, in this embodiment, the end of the key rod 122 does not extend into a hole in the rotating frame 103 to fix the orientation of the media unit 104. Thus, while a common alignment of the media disks 116 may be maintained, one shaft end 123a rotatably engages in its mounting hole 124 in the frame 103. In one embodiment illustrated in FIG. 5, the sides of the threaded shaft end 123a may be machined flat, and a lever arm 127 is fitted over the shaft end 123a before a nut 125 and washer 126 are affixed such that the lever arm 127 is at a fixed angular orientation with respect to the shaft 117. When the nut 125 is loosened slightly, the adjustment lever 127 may be used to easily rotate the shaft 117, thus changing the angular orientation of the entire adjustable media unit 104 and its opening 110 with respect to the frame 103. The adjustment lever 127 may include a pin 128 designed to extend through any one of several small positioning holes 129a-b in the frame 103. These holes 129a-b may be located so as to provide a useful range of possible orientations for the media unit 104. The holes 129a-b may be arranged in different configurations than the configuration illustrated in FIG. 5. The lever 127 and the attached media unit 104 may also be rotated so that the opening 110 in the media unit 104 will capture essentially no air 113 during rotation of the unit 101. Additional positioning holes 129a-b may be located in the frame 103 to hold the lever 127 and the attached media unit 104 in an 'out of service' position. In alternative embodiments, the hole 118 in the disk 116 is not necessarily centered or the same in each disk 116.

In one embodiment, the shaft 117 may be considered a part of the adjustable media unit 104. Also, as indicated previously, the shaft 117 may have opposing first and second ends 123a-b with one 123a end pivotally engaging the frame 103. In addition, a longitudinal axis 164 of the shaft 117 may be offset from the axis of rotation 142 (shown in FIG. 1) of the frame 103.

As further illustrated in FIG. 5, the pin 128 may be offset from a point where the adjustable media unit 104 (namely, the shaft 117 of the adjustable media unit 104) attaches to the lever arm 127.

Figure 6:
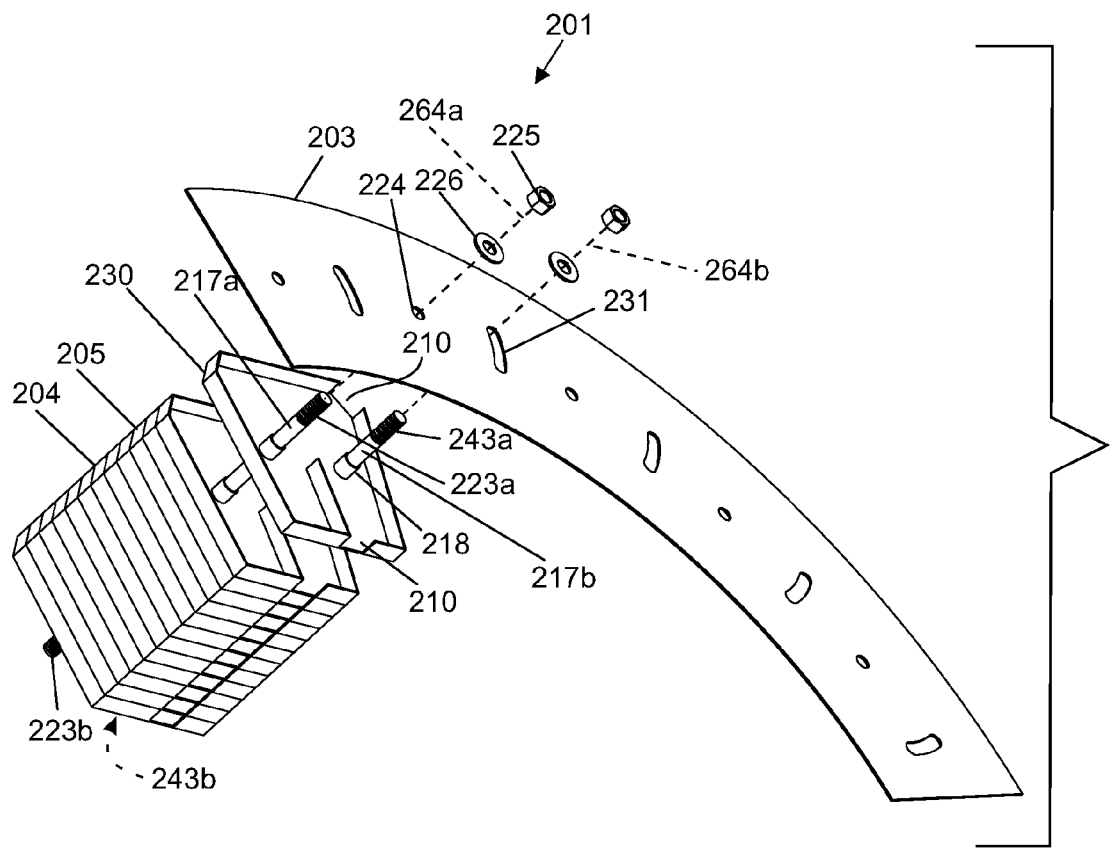
FIG. 6 is an exploded, partial view of another embodiment of the invention, showing another embodiment of an apparatus and means for adjusting the angular orientation of a trapezoidal media unit relative to the frame of a rotating treatment unit.

FIG. 6 illustrates another embodiment of the disclosed subject matter. In the illustrated embodiment, media units 204 are created by nesting roughly trapezoidal-shaped plates 230 together. The plates 230 are supported and aligned by two shafts 217a-b extending through two holes 218 in the individual plates 230. In this embodiment, the media units 204 include two openings 210 in the perimeter 205 of each media unit 204. When assembled, the threaded ends 223a, 243a of the two shafts 217a-b extend through a hole 224 and a slot 231, respectively, in the rotating frame 203, and may each be securely fastened to the frame 203 by means of a nut 225 and washer 226 or other securing or fastening mechanism. Adjustability in the orientation of the openings 210 in the media unit 204 may be accomplished by allowing one shaft 217a of the two support shafts to rotate in its mounting hole 224 and the other shaft 217b to move along a curved or arcuate slot 231 in the frame 203. This second shaft 217b may thus be positioned at any desired location along the arcuate slot 231 in the frame 203 before tightening the nuts 225, which then fixes the media unit 204 in the desired angular orientation.

Accordingly, the first shaft 217a has opposing first and second ends 223a-b with at least one 223a end pivotally engaging the frame 203. The second shaft 217b also has opposing first and second ends 243a-b with the second end 243b being obscured in the view of FIG. 6.

As illustrated in the embodiment shown in FIG. 6, a longitudinal axis 264a of a first shaft 217a may be offset from a longitudinal axis 264b of the second shaft 217b.

With reference to both FIGS. 5 and 6, in various embodiments, an adjustment means or mechanism may comprise the lever arm 127, pin 128 and associated openings 129a-b in the frame 103, as shown in FIG. 5, or a second shaft 217b and the arcuate slot 231, as shown in FIG. 6. Of course, one skilled in the art will appreciate that the adjustment mechanism and means may encompass variations of or alternatives to the attachment mechanisms or means disclosed in the figures. The adjustable media unit 104, 204 may rotatably engage the frame 103, 203 when the adjustment mechanism or means is in an unlocked state. When the adjustment mechanism or means is in a locked state, the angular orientation of the adjustable media unit 104, 204 is fixed with respect to the frame 103, 203.

The frame 103, 203 may be embodied in various ways other than those illustrated in the figures. For example, the frame 103, 203 could comprise a rotating belt or set of chains secured to one or more media units 104, 204 rather than a rigid structural element. Such a belt or set of chains would rotate about at least one axis of rotation, even if such a belt does not have a circular cross-sectional shape when in operation.

In one embodiment, disassembly of the adjustable media unit 104, 204 from the frame 103, 203 comprises displacing the adjustable media unit 104, 204 from the frame 103, 203 along the longitudinal dimension 144 (along the axis of rotation 142) of the treatment unit 101. In an alternative embodiment, disassembly of the adjustable media unit 104, 204 from the frame 103, 203 comprises displacing the adjustable media unit 104, 204 from the frame 103, 203 along any dimension 144, 146, 148 (shown in FIG. 1) of the unit 101, excluding rotation of the adjustable media unit 104, 204. In an alternative embodiment, disassembly of the adjustable media unit 104, 204 from the frame 103, 203 comprises altering a distance between the adjustable media unit 104, 204 and the frame 103, 203. In another embodiment, disassembly of the frame 103, 203 from the adjustable media unit 104, 204 comprises any physical modification of the structure of the frame 103, 203 or the media unit 104, 204. In a locked state, the angular orientation of the adjustable media units 104, 204 remains fixed.

In one embodiment, without modification of the physical structure of the adjustable media unit 104, 204 or the frame 103, 203 signifies that the physical components of the adjustable media unit 104, 204 (which may comprise the shaft 117, 217a) and the frame 103, 203 are not altered, such as by removing any portion of the physical structure (e.g., by drilling, stripping or cutting), by adding any physical component or structure to the physical structure (e.g., through the use of welding, clamps or adhesives) or by reshaping any portion of the physical structure (e.g., by bending or grinding). Modifying the physical structure does not encompass altering the interaction between physical components, such as moving the pin 128 into one of the different openings 129a-b or rotating the shaft 117, 217a.

Figure 7:
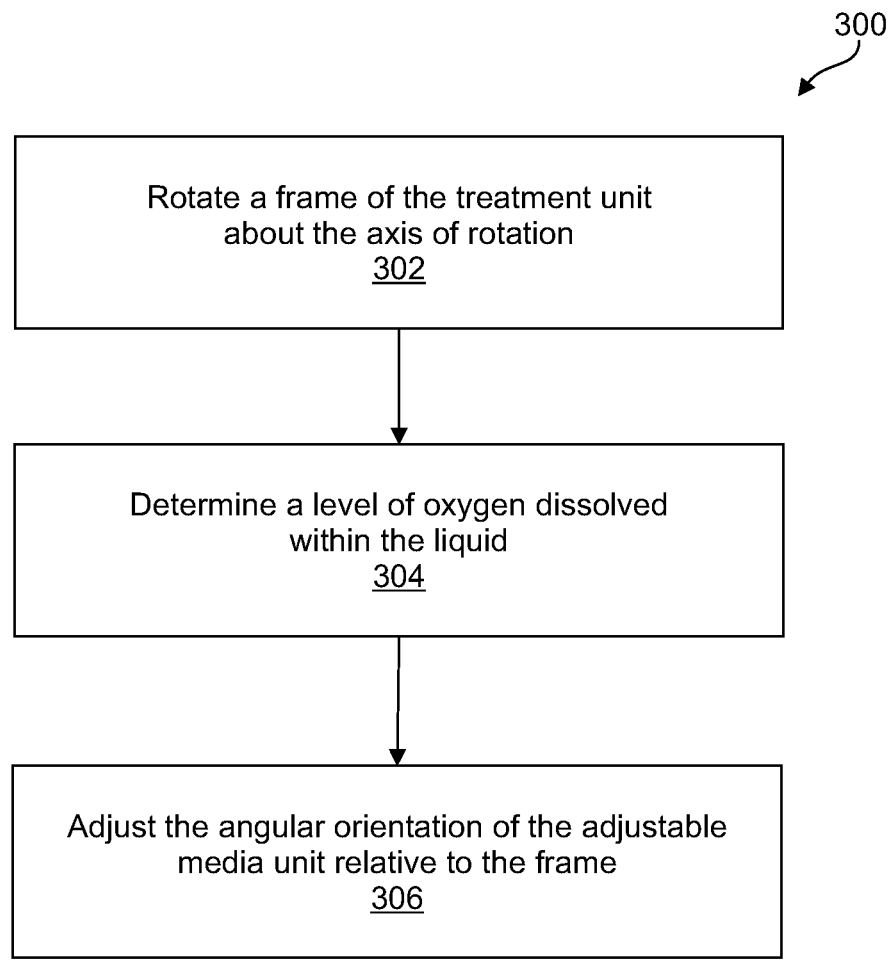
FIG. 7 is a flowchart illustrating one method for adjusting the angular orientation of a media unit secured to a frame.

FIG. 7 illustrates a flow chart of one method 300 for adjusting an angular orientation of the media unit 104, 204. The method 300 may involve rotating 302 a frame 103, 203 of the treatment unit 101, 201 about the axis of rotation 142 while a rotating treatment unit 101, 201 is partially disposed in both a liquid 114 and air 113 such that liquid 114 and air 113 enter and exit the adjustable media unit 104, 204.

The method 300 may also comprise determining 304 a level of oxygen dissolved within the liquid 114. This determination 304 may be implemented using, for example, the display/control unit 136 and the sensor 138, which are illustrated in FIG. 1.

The method 300 may also comprise adjusting 306 the angular orientation of the adjustable media unit 104, 204 relative to the frame 103, 203 without disassembling the adjustable media unit 104, 204 from the frame 103, 203 and/or without modification of the physical structure of the adjustable media unit 104, 204 or the frame 103, 203. The adjustment 306 may be performed to alter a level of dissolved oxygen within the liquid 114. The adjusting step 306 may be performed using an adjustment mechanism or means, as illustrated, for example, in connection with FIGS. 5 and 6.

The order of the foregoing steps may be altered from the order presented in FIG. 7. For example, in one embodiment, rotating 303 the frame 103, 203 may be performed before or after determining 304 the level of dissolved oxygen within the liquid 114.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. As indicated above, the accompanying method claims present elements of the various steps in a sample order, and are not meant to be limited to the specific order or hierarchy presented.

What is claimed is:

1. A rotating treatment unit comprising:
a frame comprising a rotation mechanism such that the frame is rotatable about an axis of rotation;
one or more media units secured to said frame;
each media unit having a perimeter defining an interior region and at least one opening in the perimeter, the at least one opening allowing air and liquid to enter and exit the interior region as the frame rotates about the axis of rotation when the rotating treatment unit is partially disposed in both the air and the liquid, wherein at least one of the media units comprises an adjustable media unit;
an adjustment mechanism secured to the adjustable media unit, the adjustment mechanism having a locked and an unlocked state, wherein in the unlocked state, the adjustable media unit may be rotated relative to the frame to adjust an angular orientation of the adjustable media unit relative to the frame without modification of the physical structure of the adjustable media unit or the frame and, in the locked state, the angular orientation of the adjustable media unit is fixed with respect to the frame at one of two or more angular orientations; and the adjustable media unit comprising a shaft with opposing first and second ends, at least one of the first and second ends being positioned within an opening in the frame such that the adjustable media unit may rotate about the shaft to alter the angular orientation of the adjustable media unit relative to the frame when the adjustment mechanism is in the unlocked state.

2. The rotating treatment unit of claim 1, wherein, when the adjustment mechanism is in the unlocked state, the adjustable media unit may be rotated relative to the frame to adjust the angular orientation of the adjustable media unit relative to the frame after installation of the rotating treatment unit without modification of the physical structure of the adjustable media unit or the frame.

3. The rotating treatment unit of claim 1, wherein at a first one of the two or more angular orientations, the at least one opening is positioned at a first angular orientation about the perimeter of the adjustable media unit, wherein at a second of the two or more angular orientations, the at least one opening is positioned at a second angular orientation about the perimeter of the adjustable media unit, wherein the first angular orientation is opposite the second angular orientation about the perimeter of the adjustable media unit.

4. The rotating treatment unit of claim 1, further comprising a point of entry about the perimeter of the adjustable media unit at which the adjustable media unit first contacts the liquid when the rotating treatment unit is operating in an assembled and installed state, wherein at one of the two or more angular orientations, the at least one opening of the adjustable media unit is positioned opposite the point of entry about the perimeter of the adjustable media unit.

5. The rotating treatment unit of claim 1, wherein at one of the two or more angular orientations, the adjustable media unit introduces no air into the liquid when the rotating treatment unit is operating in an assembled and installed state.

6. The rotating treatment unit of claim 1, wherein the adjustable media unit comprises multiple disks nested together.

7. The rotating treatment unit of claim 6, wherein at least two media units are oriented at different angular orientations relative to the frame, wherein the angular orientation of each media unit relative to the frame is defined by an angle between a radial line extending from a center of the media unit through the axis of rotation of the frame and another line extending from the center of the media unit through the center of the at least one opening in the media unit.

8. The rotating treatment unit of claim 1, wherein the at least one opening of the adjustable media unit is oriented at a first angular orientation relative to the frame such that, during rotation of the frame about the axis of rotation when the rotating treatment unit is partially disposed both in the air and the liquid, the adjustable media unit begins to release air captured within the interior region of the adjustable media unit through the at least one opening of the adjustable media unit into the liquid at a longer distance from a point of entry into the liquid than at least one other media unit oriented at an angular orientation other than the first angular orientation.

9. The rotating treatment unit of claim 1, wherein the at least one opening of the adjustable media unit is oriented relative to the frame such that it will capture essentially no air during rotation of the frame about the axis of rotation when the rotating treatment unit is partially disposed both in the air and the liquid.

10. A rotating treatment unit comprising:
a frame comprising a rotation mechanism such that the frame is rotatable about an axis of rotation;
one or more media units attached to said frame;
each media unit having a perimeter defining an interior region and at least one opening in the perimeter, the at least one opening allowing air and liquid to enter and exit the interior region as the frame rotates about the axis of rotation when the rotating treatment unit is partially disposed in both the air and the liquid, wherein at least one of the one or more media units comprises an adjustable media unit; and
an adjustment mechanism configured to enable rotation and fixing of an angular orientation of the adjustable media unit relative to the frame to one of two or more different angular orientations without modification of the physical structure of the adjustable media unit or the frame, wherein the angular orientation of the adjustable media unit relative to the frame is defined by an angle between a radial line extending from a center of the adjustable media unit through the axis of rotation of the frame and another line extending from the center of the adjustable media unit through the center of the at least one opening in said unit.

11. The rotating treatment unit of claim 10, wherein at a first one of the two or more angular orientations, the at least one opening is positioned at a first angular orientation about the perimeter of the adjustable media unit, wherein at a second of the two or more angular orientations, the at least one opening is positioned at a second angular orientation about the perimeter of the adjustable media unit, wherein the first angular orientation is opposite the second angular orientation about the perimeter of the adjustable media unit.

12. The rotating treatment unit of claim 10, further comprising a point of entry about the perimeter of the adjustable media unit at which the adjustable media unit first contacts the liquid when the rotating treatment unit is operating in an assembled and installed state, wherein at one of the two or more angular orientations, the at least one opening of the adjustable media unit is positioned opposite the point of entry about the perimeter of the adjustable media unit.

13. The rotating treatment unit of claim 10, wherein at one of the two or more angular orientations, the adjustable media unit introduces no air into the liquid when the rotating treatment unit is operating in an assembled and installed state.

14. A rotating treatment unit comprising:
a frame comprising a rotation mechanism such that the frame is rotatable about an axis of rotation;
one or more media units attached to said frame;
each media unit having a perimeter defining an interior region and at least one opening in the perimeter, the at least one opening allowing air and liquid to enter and exit the interior region as the frame rotates about the axis of rotation when the rotating treatment unit is partially disposed in both the air and the liquid, wherein at least one of the one or more media units comprises an adjustable media unit; and
adjustment means for rotation and fixing of an angular orientation of the adjustable media unit relative to the frame to one of two or more different angular orientations without modification of the physical structure of the adjustable media unit or the frame, wherein the angular orientation of the adjustable media unit relative to the frame is defined by an angle between a radial line extending from a center of the adjustable media unit through the axis of rotation of the frame and another line extending from the center of the adjustable media unit through a center of the at least one opening in said unit.

15. The rotating treatment unit of claim 14, further comprising a point of entry about the perimeter of the adjustable media unit at which the adjustable media unit first contacts the liquid when the rotating treatment unit is operating in an assembled and installed state, wherein at one of the two or more angular orientations, the at least one opening of the adjustable media unit is positioned opposite the point of entry about the perimeter of the adjustable media unit.

16. The rotating treatment unit of claim 14, wherein at one of the two or more angular orientations, the adjustable media unit introduces no air into the liquid when the rotating treatment unit is operating in an assembled and installed state.

17. A rotating treatment unit comprising:
a frame comprising a rotation mechanism such that the frame is rotatable about an axis of rotation;
a first media unit secured to said frame;
a second media unit secured to said frame;
each of the first and second media units having a perimeter defining an interior region and at least one opening in the perimeter, the at least one opening allowing air and liquid to enter and exit the interior region of each media unit as the frame rotates about the axis of rotation when the rotating treatment unit is partially disposed in both the air and the liquid, wherein at least one of the media units comprises an adjustable media unit,
wherein the first media unit is at a first angular orientation relative to the frame and the second media unit is at a second angular orientation relative to the frame, the first angular orientation being different from the second angular orientation, and
wherein the angular orientation of each of the first and second media units relative to the frame is defined by an angle between a radial line extending from a center of the adjustable media unit through the axis of rotation of the frame and another line extending from the center of the adjustable media unit through the center of the at least one opening in said unit.

18. The rotating treatment unit of claim 17, further comprising a point of entry about the perimeter of the first media unit at which the first media unit first contacts the liquid when the rotating treatment unit is operating in an assembled and installed state, wherein the at least one opening of the first media unit is positioned opposite the point of entry about the perimeter of the adjustable media unit.

19. The rotating treatment unit of claim 17, wherein, at the first angular orientation, the at least one opening of the first media unit is oriented about the perimeter of the first media unit such that the first media unit introduces no air into the liquid when the rotating treatment unit is operating in an assembled and installed state.

20. A method of optimizing operation of the rotating treatment unit of claim 10, the method comprising:
rotating the frame of the rotating treatment unit about the axis of rotation while the rotating treatment unit is partially disposed in both the liquid and the air such that the liquid and the air enter and exit the adjustable media unit; and
adjusting the angular orientation of the adjustable media unit relative to the frame without modification of the physical structure of the adjustable media unit or the frame.

21. The method of claim 20, wherein rotating the frame of the rotating treatment unit about the axis of rotation causes air captured within the adjustable media unit to exit the at least one opening when the adjustable media unit is positioned within the liquid, thereby resulting in oxygen within the air to be dissolved at least partially in the liquid, the method further comprising:
determining a level of oxygen dissolved within the liquid, wherein the adjusting the angular orientation of the adjustable media unit comprises adjusting the angular orientation of the adjustable media unit relative to the frame to alter the level of oxygen dissolved within the liquid.

* * * * *